United States Patent
Kanai

(10) Patent No.: US 9,003,924 B2
(45) Date of Patent: Apr. 14, 2015

(54) WAVE GEAR DEVICE AND FLEXIBLE EXTERNALLY TOOTHED GEAR

(75) Inventor: Satoru Kanai, Azumino (JP)

(73) Assignee: Harmonic Drive Systems Inc., Shinagawa-Ku, Tokyo (JP)

( * ) Notice: Subject to any disclaimer, the term of this patent is extended or adjusted under 35 U.S.C. 154(b) by 0 days.

(21) Appl. No.: 13/703,734

(22) PCT Filed: May 23, 2012

(86) PCT No.: PCT/JP2012/003375
§ 371 (c)(1),
(2), (4) Date: Dec. 12, 2012

(87) PCT Pub. No.: WO2013/175531
PCT Pub. Date: Nov. 28, 2013

(65) Prior Publication Data
US 2013/0312558 A1  Nov. 28, 2013

(51) Int. Cl.
*F16H 55/08* (2006.01)
*F16H 1/20* (2006.01)
*F16H 49/00* (2006.01)

(52) U.S. Cl.
CPC ........ *F16H 49/001* (2013.01); *F16H 2049/003* (2013.01)

(58) Field of Classification Search
CPC ............ F16H 49/001; F16H 2049/003; F16H 2049/006; F16H 2049/008; F16H 55/0833; F16H 55/0846
USPC .......................................................... 74/640
See application file for complete search history.

(56) References Cited

U.S. PATENT DOCUMENTS

| 4,909,098 | A | * | 3/1990 | Kiryu ............................... 74/640 |
| 5,269,202 | A | * | 12/1993 | Kiyosawa et al. .............. 74/640 |
| 5,715,732 | A | | 2/1998 | Takizawa et al. |
| 5,850,765 | A | * | 12/1998 | Shirasawa ........................ 74/640 |
| 6,202,508 | B1 | * | 3/2001 | Takizawa ........................ 74/640 |
| 6,615,689 | B2 | * | 9/2003 | Kobayashi ....................... 74/640 |

(Continued)

FOREIGN PATENT DOCUMENTS

| JP | 8-166052 A | 6/1996 |
| JP | 9-273608 A | 10/1997 |
| JP | 10-159917 A | 6/1998 |

OTHER PUBLICATIONS

International Search Report (PCT/ISA/210) issued on Aug. 21, 2012, by the Japanese Patent Office as the International Searching Authority for International Application No. PCT/JP2012/003375.

*Primary Examiner* — Ha D Ho
*Assistant Examiner* — Jude Agendia
(74) *Attorney, Agent, or Firm* — Buchanan Ingersoll & Rooney PC

(57) ABSTRACT

A cup-shaped flexible externally toothed gear of a wave gear device comprises a cylindrical body part, and an external-teeth area thereof includes a pushed portion pushed radially outward by a wave generator and a groove formed in a position adjacent to the pushed portion toward a diaphragm. The reaction force of the wave generator can be reduced because the groove is formed to partially reduce thickness in a portion that does not affect the root strength of the external teeth. The increase in root stress can be suppressed when the roots of the external teeth are thickened, and root strength can be effectively increased. The load torque of the wave gear device can thereby be increased.

5 Claims, 3 Drawing Sheets

(56) References Cited

U.S. PATENT DOCUMENTS

| | | |
|---|---|---|
| 6,622,593 B2* | 9/2003 | Kobayashi et al. .............. 74/640 |
| 7,735,396 B2* | 6/2010 | Ishikawa et al. ................ 74/640 |
| 8,020,470 B2* | 9/2011 | Saito ............................... 74/640 |
| 8,215,205 B2* | 7/2012 | Zhang ............................. 74/640 |
| 8,302,507 B2* | 11/2012 | Kanai ............................. 74/640 |
| 2007/0261516 A1* | 11/2007 | Saito ............................... 74/640 |

* cited by examiner

WAVE GEAR DEVICE AND FLEXIBLE EXTERNALLY TOOTHED GEAR

TECHNICAL FIELD

The present invention relates to a wave gear device, and particularly relates to the improvement of a flexible externally toothed gear which is one structural component of a wave gear device.

BACKGROUND ART

In a wave gear device, an external-teeth area in a cup-shaped or silk-hat-shaped flexible externally toothed gear is flexed into a non-circular shape, e.g., an elliptical shape by a wave generator, whereby the external teeth of the flexible externally toothed gear are partially meshed with the internal teeth of an annular rigid internally toothed gear. When the wave generator is rotated by a motor, the meshing positions of the two gears move circumferentially, and relative rotation occurs between the two gears, the rotation corresponding to the difference in the number of teeth between the two gears. When the wave gear device is used as a reducer, commonly, the rigid internally toothed gear is fixed in place so as to not rotate, high-speed rotation inputted from the motor to the wave generator is greatly reduced, and the reduced rotation is outputted from the flexible externally toothed gear.

Patent Document 1 proposes a wave gear device comprising a cup-shaped flexible externally toothed gear. In the wave gear device disclosed in this document, the face width of the external teeth of the cup-shaped and silk-hat-shaped flexible externally toothed gear is reduced for the purpose of suppressing poor meshing of the flexible externally toothed gear with the rigid internally toothed gear, whereby a proper state of meshing can be maintained between the flexible externally toothed gear and the rigid internally toothed gear. To enable the external-teeth area to flex easily, a thin portion is formed in the portion of the flexible externally toothed gear that is adjacent to the external-teeth area in the cylindrical cup part, enabling the entire external-teeth area to flex appropriately and thereby improving the state of meshing between the two gears.

PRIOR ART DOCUMENTS

Patent Documents

[Patent Document 1] Japanese Laid-open Patent Application No. 10-159917

DISCLOSURE OF THE INVENTION

Problems to be Solved by the Invention

In this device, torque is transmitted via the meshing portion between the rigid internally toothed gear and the flexible externally toothed gear. Therefore, the root strength in the external teeth of the flexible externally toothed gear is an important factor in establishing the transmitted torque. To increase the root strength of the external teeth, it is preferable to increase the thickness of the roots and reduce stress on the roots. However, when the roots are thickened, the external-teeth area of the flexible externally toothed gear flexes less readily in proportion to the thickening, and greater stress acts on the wave generator that causes the external-teeth area to flex. Particularly in the case of cup-shaped and silk-hat-shaped flexible externally toothed gears, the external-teeth areas in the open ends of the cylindrical cup parts of these gears are made to flex into a non-circular shape by a wave generator, the external-teeth area therefore deforms three-dimensionally in a complex manner, and great stress acts on the wave generator. As a result, there is an increase of the reaction force of the wave generator acting on the external-teeth area, the stress in the roots of the external teeth increases accordingly, and the effect of improving root strength by increasing root thickness is lost.

An object of the present invention is to provide a wave gear device wherein the reaction force of the wave generator acting on the roots of the external teeth in the flexible externally toothed gear can be effectively reduced, and the stress in the roots of the external teeth can be alleviated.

Means to Solve the Problem

The cup-shaped or silk-hat-shaped flexible externally toothed gear of the wave gear device of the present invention comprises a cylindrical body part, a diaphragm formed continuously in one end of the cylindrical body part, and external teeth formed in the external peripheral surface portion of the other end region of the cylindrical body part. The external-teeth area of the flexible externally toothed gear (the portion of the cylindrical body part where the external teeth are formed) includes a pushed portion pushed radially outward by a wave generator, and a groove formed in a position offset toward the diaphragm from the pushed portion. The groove is formed throughout the entire internal peripheral surface of the external-teeth area, and the groove area where the groove is formed in the external-teeth area is thinner than regions of the external-teeth area other than the groove area. The cross-sectional shape of the groove is defined by a concave curve.

Therefore, in the external-teeth area, sufficient root thickness is ensured in the pushed portion pushed in the radial direction by the wave generator, and the adjacent regions are reduced in thickness by the groove.

Effect of the Invention

In the present invention, in the external-teeth area of the flexible externally toothed gear, the regions other than the pushed portion pushed by the wave generator, i.e., the regions that do not affect the strength of the roots of the external teeth are partially made thinner in places by the formation of the groove. Consequently, the reaction force acting on the wave generator can be reduced. As a result, the increase of stress in the roots can be suppressed when the roots of the external teeth are made thicker, and the root strength can be effectively increased. The transmitted load torque of the wave gear device can thereby be increased.

MODE FOR CARRYING OUT THE INVENTION

An embodiment of a wave gear device to which the present invention is applied is described hereinbelow with reference to the drawings.

Figure 1:
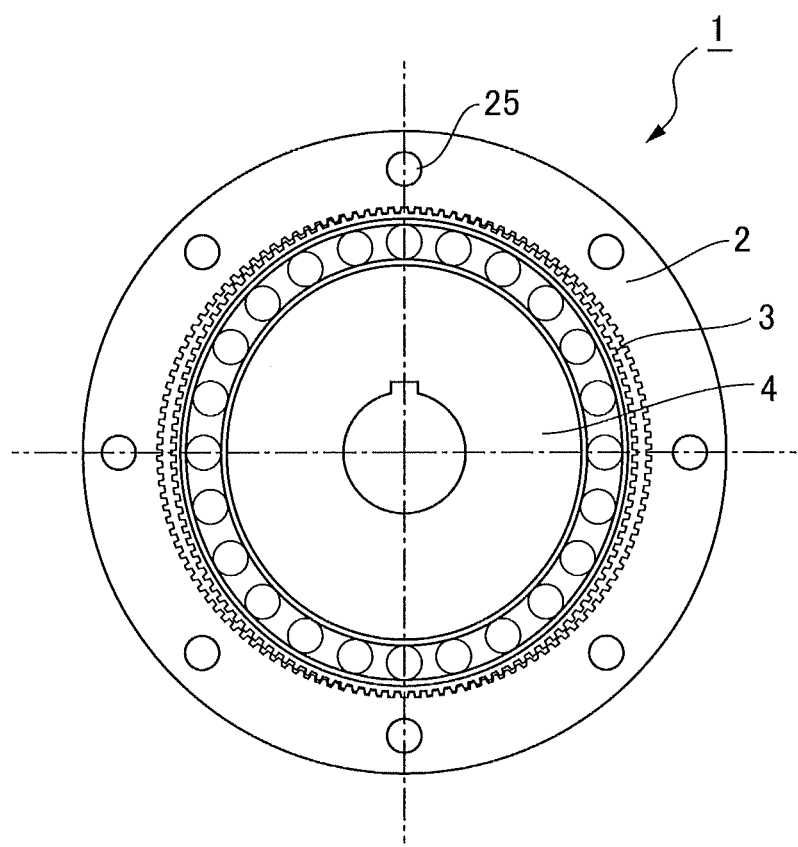
FIG. 1 is a schematic front view of a wave gear device to which the present invention is applied.
Figure 2:
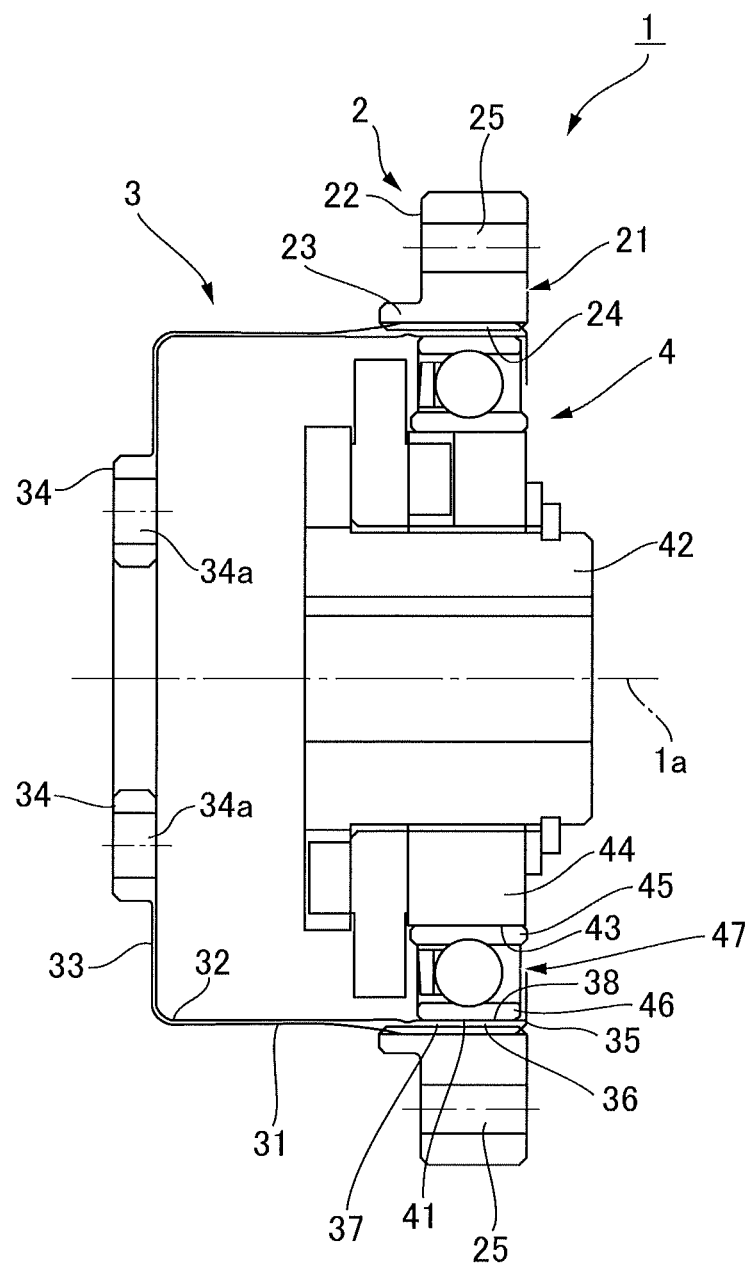
FIG. 2 is a longitudinal cross-sectional view of the wave gear device of FIG. 1.

The overall configuration of a wave gear device according to the present embodiment is described with reference to FIGS. 1 and 2. A wave gear device 1 has an annular rigid internally toothed gear 2, a flexible externally toothed gear 3 disposed on the inner side of the rigid internally toothed gear 2, and a wave generator 4 disposed on the inner side of the flexible externally toothed gear 3.

The rigid internally toothed gear 2 includes a rigid annular member 21 that is rectangular in overall cross-sectional shape. In the inner peripheral edge portion of this annular member 21, a cylindrical portion 23 protruding in a cylindrical shape a certain thickness from one end surface 22 is formed, creating a wide-width portion. Internal teeth 24 are formed in the circular internal peripheral surface of this wide-width portion. Attachment bolt holes 25 are formed in the annular member 21 at predetermined angle intervals along the circumferential direction thereof. The bolt holes 25 extend through the annular member 21 in a direction parallel to a gear center axis 1a.

The flexible externally toothed gear 3 has a cup shape overall, and includes a cylindrical body part 31 capable of flexing in the radial direction, a diaphragm 33 extending radially inward as a continuation of the rear end edge 32 of the cylindrical body part 31, and a thick-walled annular boss 34 formed as a continuation of the internal peripheral edge of the diaphragm 33. Attachment bolt holes 34a are formed in the boss 34 at predetermined angle intervals along the circumferential direction. The region on the other side of the cylindrical body part 31 having an open edge 35 is an external-teeth area 37, wherein external teeth 36 are formed in the external peripheral surface portion thereof.

The wave generator 4 includes an external-teeth-pushing surface 41 which pushes the internal peripheral surface portion 38 of the external-teeth area 37 radially outward in the cylindrical body part 31 of the flexible externally toothed gear 3. The external-teeth area 37 of the flexible externally toothed gear 3 is made to flex into a non-circular shape by the external-teeth-pushing surface 41, and the external teeth 36 mesh with the internal teeth 24 of the rigid internally toothed gear 2 in a plurality of regions separated in the circumferential direction. When the wave generator 4 is rotated, the meshing positions of the external teeth 36 and the internal teeth 24 also move in the circumferential direction, and relative rotation occurs between the flexible externally toothed gear 3 and the rigid internally toothed gear 2, the relative rotation corresponding to the difference in the number of teeth between the external teeth 36 and the internal teeth 24.

The wave generator 4 includes a hollow input shaft 42, a plug 44 coaxially fixed on the circular external peripheral surface of the hollow input shaft 42 and having a non-circular, e.g., elliptical external peripheral surface 43, and a wave bearing 47 having an inner ring 45 and an outer ring 46 capable of flexing in the radial direction. The wave bearing 47 is mounted in a state of being flexed into an elliptical shape to the external peripheral surface 43 of the plug 44. The external peripheral surface of the outer ring 46 of the wave bearing 47 is the external-teeth-pushing surface 41 which pushes the external-teeth area 37 radially outward.

Figure 3:
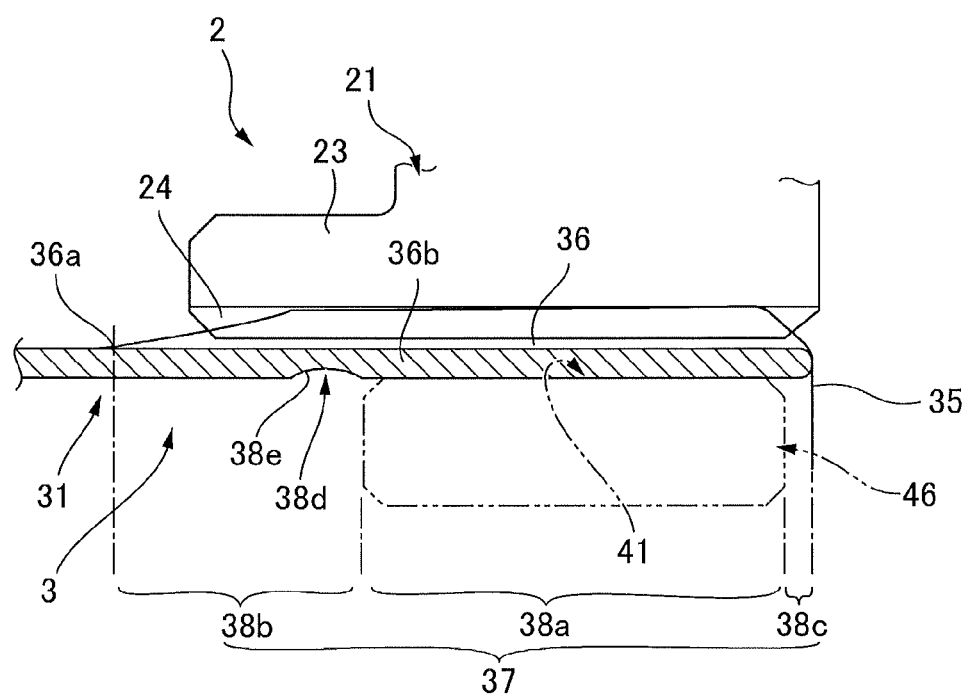
FIG. 3 is a partial enlarged cross-sectional view showing an enlargement of the portion where the groove is formed in the cup-shaped flexible externally toothed gear of the wave gear device of FIG. 2.

To give a description referring to FIG. 3 as well, the width of the external-teeth area 37 (the width in the direction of the gear center axis 1a) in the cylindrical body part 31 of the flexible externally toothed gear 3 is greater than the width of the external-teeth-pushing surface 41 which is the external peripheral surface of the outer ring 46. Specifically, the external-teeth area 37 includes a pushed portion 38a pushed radially outward by the external-teeth-pushing surface 41, an adjacent portion 38b extending from the pushed portion 38a to an end 36a of the external teeth 36 in the tooth trace direction in the side of the diaphragm 33, and a tip-side portion 38c extending to the open edge 35 from the end of the pushed portion 38a in the side opposite the diaphragm 33.

A single groove 38d of a certain width is formed in the region of the adjacent portion 38b which is adjacent to the pushed portion 38a. Specifically, the groove 38d is formed in a position offset toward the diaphragm 33 from the pushed portion 38a, and in the present example this position is adjacent to the pushed portion. The groove 38d extends through the entire periphery of the internal peripheral surface 37a of the external-teeth area 37. Assuming the external-teeth area 37 is sectioned through a plane including the gear center axis 1a, the cross-sectional shape of the groove 38d is defined by a concave curve, which in the present example is an arc 38e of the same radius. The thickness of the groove area in the external-teeth area 37 gradually decreases from the pushed portion 38a and then gradually increases, so that there is no concentration of stress.

Thus, in the present example, the roots 36b of the external teeth 36 have partially reduced thickness in positions adjacent toward the diaphragm from the outer ring 46 of the wave bearing 47 of the wave generator 4. Consequently, stress occurring in the roots 36b of the external teeth 36 can be alleviated, and the reaction force of the wave generator 4 (the wave bearing reaction force) can be reduced. It is therefore easy to increase the thickness of the roots 36b to efficiently increase root strength, and to increase the load torque of the wave gear device 1.

In Patent Document 1 cited previously (JPA No. 10-159917), the face width of the external teeth of the flexible externally toothed gear is reduced for the purpose of suppressing poor meshing of the flexible externally toothed gear with the rigid internally toothed gear. A groove is formed in a position away from the external-teeth area, enabling the entire external-teeth area to flex appropriately and improving meshing between the two gears. Concerning this matter, a purpose of the present invention is to increase the thickness of the external-teeth area to efficiently increase the root strength of the external teeth, and to achieve this purpose, the groove is formed in a position away from the region pushed by the wave bearing in the external-teeth area, and the wave bearing reaction force of the wave generator is reduced. A merit of the present invention is that stress in the wave bearing is alleviated without reducing the face width of the external teeth.

The example above relates to a wave gear device comprising a cup-shaped flexible externally toothed gear, but the present invention can be similarly applied to a wave gear device comprising a silk-hat-shaped flexible externally toothed gear.

In the example above, the flexible externally toothed gear is made to flex into an elliptical shape by the elliptically contoured wave generator, the external teeth mesh with the internal teeth at two locations along the circumference, and the difference in the number of teeth between the two gears is set to 2n (n being a positive integer). As an alternative, the flexible externally toothed gear can be made to flex into a non-circular shape so that the two gears mesh with each other at three locations along the circumference.

Furthermore, the wave generator used in the example above is one that includes a rigid plug having a non-circular external peripheral surface. Another possible option is a wave generator having a configuration that causes the flexible externally toothed gear to flex into an elliptical shape by a pair of rollers, for example, instead of the plug.

The invention claimed is:

1. A wave gear device comprising:

an annular rigid internally toothed gear, a flexible externally toothed gear disposed on an inner side of the rigid internally toothed gear, and a wave generator disposed on an inner side of the flexible externally toothed gear;

the flexible externally toothed gear having a cylindrical body part capable of flexing radially, a diaphragm expanding radially inward or outward as a continuation of one edge of the cylindrical body part, and external teeth formed in an external peripheral surface portion of the cylindrical body part on the other side of the cylindrical body part having an open edge;

the wave generator having an external-teeth-pushing surface for pushing radially outward an internal peripheral surface portion of an external-teeth area of the cylindrical body part where the external teeth are formed; and the external-teeth area of the flexible externally toothed gear being made to flex into a non-circular shape by the external-teeth-pushing surface, the external teeth meshing with internal teeth of the rigid internally toothed gear in a plurality of circumferentially separated regions, and, when the wave generator is rotated, the meshing positions of the external teeth and the internal teeth also moving circumferentially and relative rotation corresponding to the difference in the number of the external teeth and internal teeth occurring between the flexible externally toothed gear and the rigid internally toothed gear;

the wave gear device wherein:

the external-teeth area in the cylindrical body part includes a pushed portion pushed radially outward by the external-teeth-pushing surface of an outer ring and wherein the pushed portion is in direct contact with the external-teeth-pushing surface of the outer ring, an adjacent portion adjacent to the pushed portion toward the diaphragm, and a groove formed in the adjacent portion;

the groove extends along an internal peripheral surface of the external-teeth area through the entire periphery thereof; and a thickness of the adjacent portion where the groove is formed is reduced compared to that of the pushed portion.

2. The wave gear device of claim 1, wherein:

when the external-teeth area is sectioned along a plane including a gear center axis, a cross-sectional shape of the groove is defined by a concave curve.

3. The wave gear device of claim 1, wherein:

the wave generator includes a rigid member having a non-circular external peripheral surface and a wave bearing having an outer ring and an inner ring capable of flexing radially, the wave bearing being mounted in a non-circular flexed state to an external peripheral surface of the rigid member; and an external peripheral surface of the outer ring is the external-teeth-pushing surface.

4. A flexible externally toothed gear of a wave gear device, comprising:

a cylindrical body part capable of flexing radially, a diaphragm expanding radially inward or outward as a continuation of one edge of the cylindrical body part, and external teeth formed in an external peripheral surface portion of the cylindrical body part on the other side of the cylindrical cup part having an open edge;

an external-teeth area in the cylindrical body part including a pushed portion pushed radially outward by an external-teeth-pushing surface of an outer ring and wherein the pushed portion is in direct contact with the external-teeth-pushing surface of the outer ring, an adjacent portion adjacent to the pushed portion toward the diaphragm, and a groove formed in the adjacent portion; and the groove extending along an internal peripheral surface of the external-teeth area through the entire periphery thereof.

5. The flexible externally toothed gear of a wave gear device of claim 4, wherein:

when a section along a plane including a gear center axis, a cross-sectional shape of the groove is defined by a concave curve.

* * * * *